United States Patent [19]
Garwood

[11] 3,749,117
[45] July 31, 1973

[54] DRIVE MECHANISM FOR A SELF-PROPELLED IRRIGATION SYSTEM

[76] Inventor: Blaine E. Garwood, Rt. 1, Atkinson, Nebr. 68713

[22] Filed: Nov. 17, 1971

[21] Appl. No.: 199,582

[52] U.S. Cl. ............................................. 137/344
[51] Int. Cl. ......................... B05b 9/02, E01h 3/02
[58] Field of Search .................... 239/212, 213, 177; 137/344

[56] References Cited
UNITED STATES PATENTS

| | | | |
|---|---|---|---|
| 3,533,556 | 10/1970 | Dowd | 239/212 X |
| 2,941,727 | 6/1960 | Zybach | 239/212 X |
| 3,237,867 | 3/1966 | Hogg | 239/212 |
| 3,463,175 | 8/1969 | Rogers | 137/344 X |
| 3,223,461 | 12/1965 | Stout | 239/212 X |
| 3,268,174 | 8/1966 | Boone | 239/212 |
| 3,302,883 | 2/1967 | Stout | 239/212 |
| 3,610,531 | 10/1971 | Erickson | 239/213 X |
| 3,613,703 | 10/1971 | Stout | 239/212 |

Primary Examiner—Samuel Scott
Attorney—Zarley, McKee & Thomte

[57] ABSTRACT

A drive mechanism for a self-propelled irrigation system is disclosed herein. The irrigation system includes an elongated water distribution pipe having one end pivotally supported and in communication with a source of water pressure. A plurality of spaced apart support towers are secured to the distribution pipe along the length thereof for supporting the pipe above ground level. A plurality of sprinklers are provided along the length of the pipe for sprinkling the field as the pipe is moved around its center pivot. An elongated extendible member is pivotally secured at its upper end to each of the towers and extends downwardly and laterally therefrom so that its lower end is in ground engagement. A hydraulic cylinder means is connected to the extendible member for selectively causing the extendible member to be extended whereby said extension causes the tower to be moved laterally to propel the pipe. Alignment means is also provided for selectively controlling the operation of the hydraulic cylinder.

3 Claims, 9 Drawing Figures

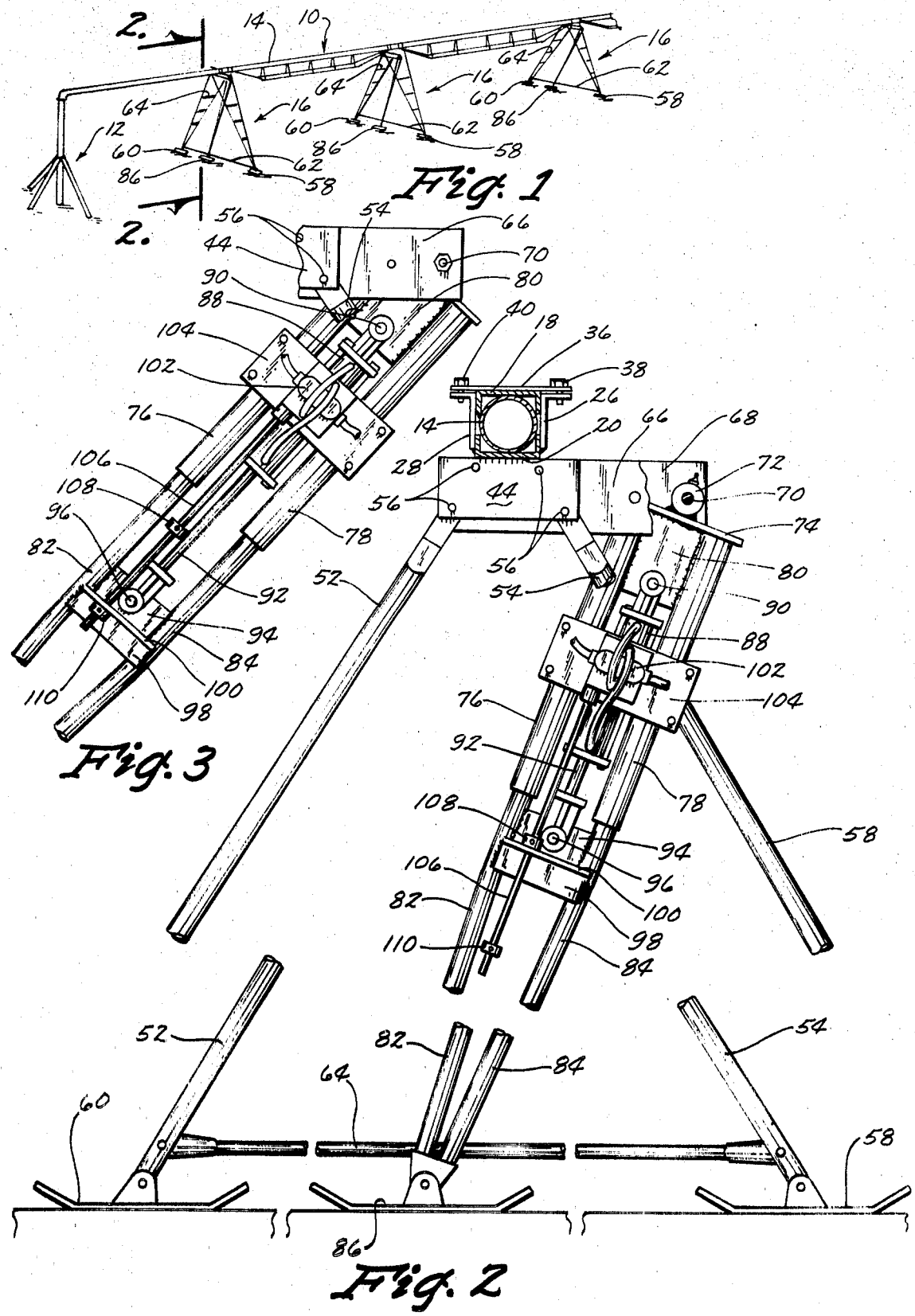

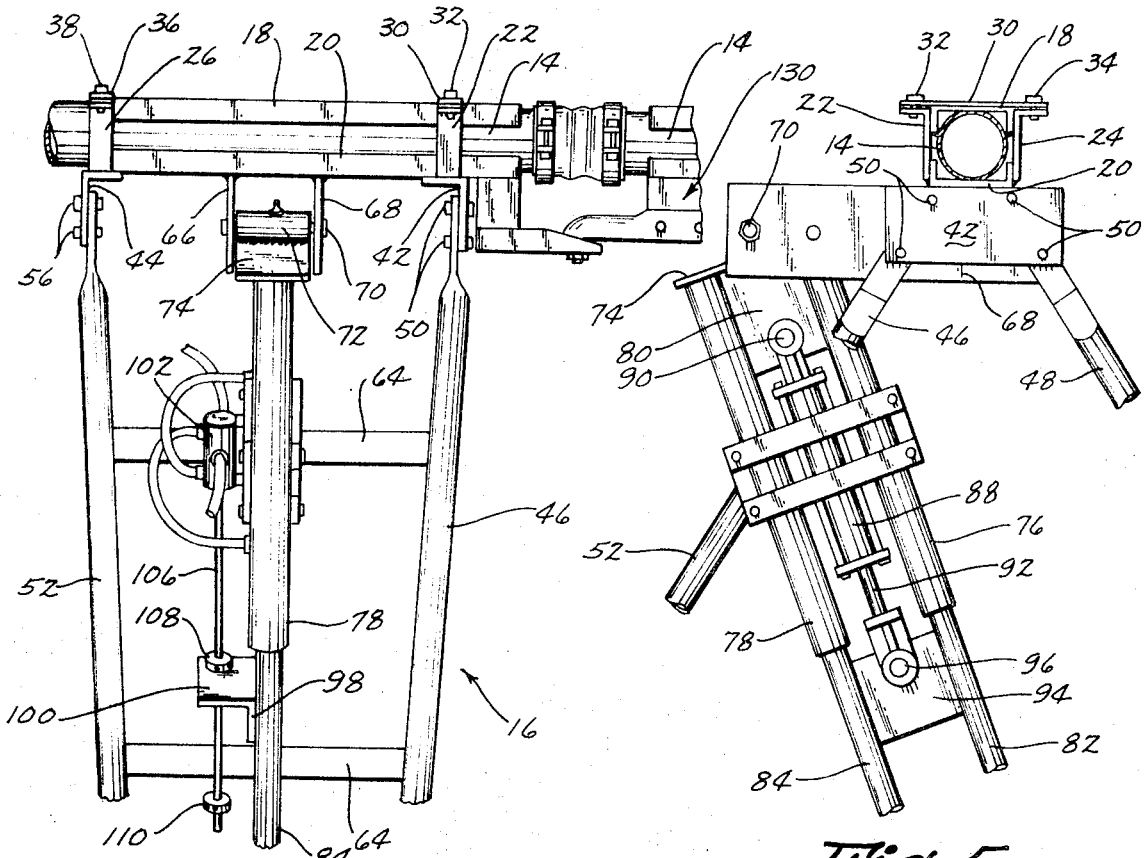

DRIVE MECHANISM FOR A SELF-PROPELLED IRRIGATION SYSTEM

Center pivot irrigation systems have gained wide acceptance in recent years. The cost of such systems is enormous which makes it extremely difficult for the average person to purchase.

Therefore, it is a principal object of this invention to provide a self propelled irrigation system which is extremely economical of manufacture.

A further object of this invention is to provide a self-propelled irrigation system including a novel means for driving the support towers.

A further object of this invention is to provide a drive mechanism for a self-propelled irrigation system which is extremely reliable.

A further object of this invention is to provide a drive mechanism for a self-propelled irrigation system which permits the towers to be constructed of light weight material.

A further object of this invention is to provide a drive mechanism for a self-propelled irrigation system including means for selectively adjusting the stroke of the extendible member.

A further object of this invention is to provide a drive mechanism for a self-propelled irrigation system which is efficient in operation.

These and other objects will be apparent to those skilled in the art.

This invention consists in the construction, arrangements and combinations of the various parts of the device, whereby the objects contemplated are attained as hereinafter more fully set forth, specifically pointed out in the claims, and illustrated in the accompanying drawings, in which:

FIG. 1 is a partial perspective view of the irrigation system of the invention:

FIG. 2 is an enlarged sectional view seen along lines 2—2 of FIG. 1:

FIG. 3 is a partial view illustrating the stroke control means for the hydraulic cylinder:

FIG. 4 is a front view of one of the towers:

FIG. 5 is a sectional view opposite to FIG. 2:

FIG. 6 is a front view of one of the towers:

FIGS. 7 and 8 are views illustrating the manner in which the tower is moved; and FIG. 9 is a schematic view of the hydraulic circuitry of the invention.

The numeral 10 generally refers to a self-propelled irrigation system having a center pivot 12 with an elongated water distribution pipe 14 extending therefrom and being supported by a plurality of support towers 16. Pipe 14 is in communication with a source of water under pressure and has a plurality of sprinklers positioned along the length thereof to irrigate the field as the support towers 16 propel the pipe 14 around its center pivot 12.

The pipe 14 is comprised of a plurality of pipe sections secured together in an end to end relationship and includes alignment means for maintaining the pipe sections in alignment as the towers 16 propel the pipe 14 around its center pivot.

Inasmuch as all of the support towers 16 are identical, only one tower will be described. An elongated channel member 18 is positioned over the top of the pipe 14 as illustrated in the drawings and is welded thereto. An elongated channel member 20 embraces the bottom portion of the pipe 14 below channel member 18 as illustrated in FIGS. 4 and 5 and has L-shaped brackets 22 and 24 secured to one end thereof and extending upwardly therefrom. A pair of L-shaped brackets 26 and 28 are secured to the other end of channel member 20 at the other end thereof at opposite sides thereof and extend upwardly therefrom. A bar 30 extends over the top portion of the channel member 18 at one end thereof and is secured to the upper ends of the brackets 22 and 24 by bolts 32 and 34. Likewise, a bar 36 extends over the top of a channel member 18 at the other end thereof and is secured to the upper ends of the brackets 26 and 28 by bolts 38 and 40.

Plates 42 and 44 are secured to channel member 20 adjacent opposite ends thereof by welding or the like and extend downwardly therefrom as illustrated in FIG. 4. Tower legs 46 and 48 are secured to the plate 42 by bolts 50 and extend downwardly and outwardly therefrom. Tower legs 52 and 54 are secured to plate 44 by bolts 56 and extend downwardly and outwardly therefrom. The lower ends of tower legs 48 and 54 converge and are joined together by a suitable means such as welding or the like. Likewise, tower legs 46 and 52 converge so that their lower ends meet to permit the same to be secured together by any convenient means such as welding or the like. A pivotal shoe or skid 58 is secured to the lower ends of legs 48 and 54 while a pivotal shoe or skid 60 is secured to the lower ends of tower legs 46 and 52. A brace arm 62 extends between the lower ends of the tower legs as illustrated in FIG. 2. A plurality of braces 64 are secured to each pair of legs and extend there-between as illustrated in FIG. 1 and in FIG. 6.

A pair of spaced apart plates 66 and 68 are welded to the bottom of channel member 20 between plates 42 and 44 as illustrated in FIG. 4 and extend downwardly therefrom. Bolt member 70 extends through and between the plates 66 and 68 and has pipe 72 rotatably mounted thereon between the plates 66 and 68. A support plate 74 is welded to pipe member 72 as illustrated in FIG. 2. A pair of spaced apart pipes 76 and 78 are secured to the botom surface of support plate 74 by welding or the like and extend downwardly therefrom in a spaced apart relationship. A gusset plate 80 is secured to and extends between the upper ends of the pipes 76 and 78 as illustrated in FIG. 2. Gusset plate 80 is also welded to the support plate 74.

A pair of pipes 82 and 84 have their upper ends telescopically received by the pipes 76 and 78 as illustrated in FIG. 2 and extend downwardly therefrom. The pipes 82 and 84 converge at their lower ends as illustrated in FIG. 2 and have a pivotal shoe 86 secured thereto. A hydraulic cylinder 88 is pivotally connected at its upper end to the gusset plate 80 at 90 and extends downwardly therefrom between the pipes 76 and 78. The cylinder rod 92 of the hydraulic cylinder 88 is pivotally connected to a plate 94 at 96. The plate 94 is welded to the pipes 82 and 84 and extends therebetween. An L-shaped member 98 is secured to and extends between the pipes 82 and 84 as shown in FIG. 2 and has its flange portion 100 extending outwardly therefrom.

A control valve 102 is secured to a mounting bracket 104 which is in turn secured to the pipes 76 and 78. An actuator rod or stroke control rod 106 extends downwardly from valve 102 and extends through a suitable opening formed in the flange portion 100 of member 98. A pair of actuator elements 108 and 110 are adjustably secured to the rod 106 above and below the flange portion 100 and are adapted to control the operation of the valve 102 upon engaging the flange portion 100. The rod 106 controls the operation of the valve 102 so that the cylinder rod 92 will be extended from the cylinder 88 until element 110 engages the flange portion 100 whereupon the valve 102 will be actuated so as to withdraw the cylinder rod 92 into the cylinder 88. The rod 92 is withdrawn into the cylinder 88 until the flange portion 100 engages the element 108.

Valve 102 is fluidly connected to a main or alignment valve 112 by conduit 114. Pump 116 is fluidly connected to the valve 112 by conduit 118. The pump 116 is connected to the reservoir 120 by the conduit 122. Reservoir 120 is connected to the valve 102 by means of conduit 124. Valve 102 is connected to the double acting cylinder 88 by conduits 126 and 128 as illustrated in FIG. 9. Each of the towers includes alignment means generally indicated by the reference numeral 130 which is adapted to control the operation of valve 112 on the towers 16 to cause the tower to be moved the proper amount to keep the pipe 14 in alignment. The alignment means on each of the towers insures that the pipe 14 will remain in alignment as it pivots around the center pivot 12.

In operation, the source of water pressure is activated so that water is furnished to the sprinklers along the length of the pipe 14. The pump 116 is actuated to furnish fluid under pressure to the valve 112 on each of the towers 16. The valves 112 are normally open to furnish hydraulic fluid under pressure to the valve 102. The alignment means 130 causes more or less hydraulic fluid to be delivered from the valve 112 depending upon the relative alignment of the tower. The valve 102 causes fluid to be supplied to the cylinder 88 through conduit 128 which causes the extension of cylinder rod 92. The extension of cylinder rod 92 causes the telescopic extension of the pipes 76 and 78 with respect to the pipes 82 and 84. The initial extension of the pipes 82 and 84 causes the shoe 86 to "dig" into the ground. Continued extension of the cylinder rod 92 causes the pipes 76 and 78 to be raised upwardly with respect to the pipes 82 and 84 so that the bolt 70 causes the plates 66 and 68 to be raised upwardly and laterally which in turn causes the tower legs to be raised upwardly out of ground engagement. It can be seen in FIG. 7 that the tower legs at the right side of the support tower are the first legs to raise upwardly out of ground engagement. The cylinder 92 continues to extend and the offset relationship of the upper end of the bolt 70 with respect to the pipe 14 causes the entire tower to be moved to the right as viewed in FIG. 8. In other words, when the cylinder rod has been sufficiently extended, the weight of the upper end of the tower causes the tower to move to the right as viewed in FIG. 8 until the legs at the right side of the tower again come into ground engagement. The rod 106 controls the stroke of the cylinder rod 92 to permit the selective amount of extension of the rod 92 to control the amount of lateral movement given to the tower for each stroke of the hydraulic cylinder.

As soon as the tower has moved back into ground engagement as seen in FIG. 8, the hydraulic cylinder rod 92 is withdrawn into the cylinder 88 thereby causing the pipes 82 and 84 to be withdrawn upwardly into the pipes 76 and 78 respectively. The upward movement of the pipes 82 and 84 into the pipes 76 and 78 respectively causes the shoe 86 to be moved to the right to reposition the apparatus for the next stroke of the hydraulic cylinder. The shoe 86 returns to the position just described since the upper end of the apparatus is pivotally connected to the plates 66 and 68. The shoe 86 will return to the position generally shown in FIG. 7.

Thus it can be seen that a unique drive mechanism has been provided for a support tower of a center pivot irrigation system which is extremely economical of manufacture but which is extremely durable in use. The apparatus of this invention eliminates the necessity of expensive transmissions, wheels, heavy duty support tower legs, etc. The apparatus of this invention permits the precise control of the support towers to insure that the pipe 14 will not become damaged during the operation of the irrigation system. While the apparatus has been described as comprising hydraulic means, it should be noted that an air cylinder may be used in lieu of the hydraulic cylinder 88.

Thus it can be seen that the invention accomplishes at least all of its stated objectives.

I claim:
1. In combination,
an elongated water distribution pipe having one end thereof in communication with a source of water, said pipe being pivotal about its said one end,
a plurality of spaced apart support towers secured adjacent their upper ends to said pipe along the length thereof for supporting said pipe above ground level,
an elongated extendible member operatively pivotally secured at one end to each of said towers and extending downwardly therefrom so that its other end engages the ground,
and a power means connected to each of said extendible member for selectively causing said extendible member to be extended whereby said extension causes said tower to be moved so that said distribution pipe is propelled around its said one end,
said extendible member comprising first and second telescoping members, said power means comprising a power cylinder means for telescoping said members with respect to each other.

2. In combination,
an elongated water distribution pipe having one end thereof in communication with a source of water, said pipe being pivotal about its said one end,
a plurality of spaced apart support towers secured adjacent their upper ends to said pipe along the length thereof for supporting said pipe above ground level,
an elongated extendible member operatively pivotally secured at one end to each of said towers and extending downwardly therefrom so that its other end engages the ground,
and a power means connected to each of said extendible member for selectively causing said extendible member to be extended whereby said extension causes said tower to be moved so that said distribution pipe is propelled around its said end,
one end of said extendible member being pivotally connected to said tower laterally of said distribution pipe, said extendible member normally extending downwardly and laterally from its said one end below said water distribution pipe,
each of said towers comprising first and second leg means operatively secured at their upper ends to said pipe and extending downwardly and outwardly therefrom, the lower end of said extendible member being positioned between the lower ends of said first and second leg means, said one end of said extendible member being pivotally secured to said tower laterally of the upper ends of said first and second leg means, said extendible member comprising first and second pipes pivotally secured at their upper ends to said tower, third and fourth pipes slidably received by said first and second pipes respectively and extending downwardly therefrom, the lower ends of said third and fourth pipes being in operative ground engagement, a hydraulic cylinder means connecting said first and second pipes with said third and fourth pipes to cause said third and fourth pipes to be extended from said first and second pipes.

3. The combination of claim 2 wherein a valve means is fluidly connected to said hydraulic cylinder means for controlling the operation of said hydraulic cylinder means, said valve means having a stroke control rod extending therefrom which is engageable with said third and fourth pipes to control the length of stroke of the hydraulic cylinder means.

* * * * *